(12) United States Patent
Burke et al.

(10) Patent No.: US 10,372,863 B2
(45) Date of Patent: *Aug. 6, 2019

(54) TOOL FOR MODULAR CIRCUIT BOARD DESIGN

(71) Applicant: Arch Systems Inc., Mountain View, CA (US)

(72) Inventors: Timothy Matthew Burke, Mountain View, CA (US); Christopher Ling, Mountain View, CA (US)

(73) Assignee: Arch Systems Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/106,584

(22) Filed: Aug. 21, 2018

(65) Prior Publication Data
US 2018/0357352 A1    Dec. 13, 2018

Related U.S. Application Data

(63) Continuation of application No. 15/816,132, filed on Nov. 17, 2017, now Pat. No. 10,089,431.

(60) Provisional application No. 62/434,572, filed on Dec. 15, 2016, provisional application No. 62/424,000, filed on Nov. 18, 2016.

(51) Int. Cl.
| | |
|---|---|
| *G06F 17/50* | (2006.01) |
| *H05K 3/00* | (2006.01) |
| *H05K 3/30* | (2006.01) |
| *H05K 3/36* | (2006.01) |
| *H05K 1/02* | (2006.01) |

(52) U.S. Cl.
CPC ...... *G06F 17/5072* (2013.01); *G06F 17/5045* (2013.01); *H05K 3/0005* (2013.01); *H05K 3/306* (2013.01); *H05K 3/368* (2013.01); *G06F 2217/02* (2013.01); *G06F 2217/12* (2013.01); *H05K 1/0286* (2013.01)

(58) Field of Classification Search
CPC ............. G06F 17/5072; G06F 17/5045; G06F 2217/02; G06F 2217/12; H05K 3/0005; H05K 3/368; H05K 3/306
USPC ........................................................ 716/137
See application file for complete search history.

(56) References Cited

U.S. PATENT DOCUMENTS

| | | | |
|---|---|---|---|
| 5,414,638 A * | 5/1995 | Verheyen | H03K 19/17704 716/101 |
| 5,452,228 A * | 9/1995 | Arakawa | G06F 17/5031 716/113 |
| 5,892,682 A | 4/1999 | Hasley et al. | |
| 6,530,072 B1 | 3/2003 | Hagerman et al. | |
| 7,904,864 B2 | 3/2011 | Huynh et al. | |

(Continued)

*Primary Examiner* — Jack Chiang
*Assistant Examiner* — Brandon Bowers
(74) *Attorney, Agent, or Firm* — Jeffrey Schox; Diana Lin

(57) ABSTRACT

A system for dynamic circuit board design, preferably including a library of modular circuits and a merge tool. A method for merging modular circuitry into a unified electronics module, preferably including: receiving a circuit board layout, the circuit board layout preferably including a set of modular circuits arranged on a virtual carrier board; converting the circuit board layout into a virtual circuit representation; applying transformations to the virtual circuit representation; and generating a unified circuit board design based on the transformed virtual circuit representation.

23 Claims, 12 Drawing Sheets

(56) References Cited

U.S. PATENT DOCUMENTS

| | | | |
|---|---|---|---|
| 7,912,692 B2 * | 3/2011 | Matsushita | G06F 17/5009 |
| | | | 703/13 |
| 8,438,524 B1 * | 5/2013 | Kohli | G06F 17/5068 |
| | | | 716/120 |
| 8,839,174 B2 * | 9/2014 | Suiter | G06F 17/5072 |
| | | | 716/118 |
| 9,465,903 B1 | 10/2016 | Timmireddy et al. | |
| 2002/0066068 A1 * | 5/2002 | Jennion | G06F 17/5045 |
| | | | 716/102 |
| 2003/0056182 A1 * | 3/2003 | Rosenbaum | G06F 17/5068 |
| | | | 716/102 |
| 2011/0004860 A1 | 1/2011 | Staiger et al. | |

\* cited by examiner

TOOL FOR MODULAR CIRCUIT BOARD DESIGN

CROSS-REFERENCE TO RELATED APPLICATIONS

This application is a continuation of prior U.S. patent application Ser. No. 15/816,132, filed 17 Nov. 2017, which claims the benefit of U.S. Provisional Application Ser. No. 62/424,000, filed 18 Nov. 2016, and U.S. Provisional Application Ser. No. 62/434,572, filed 15 Dec. 2016, each of which is incorporated in its entirety by this reference.

TECHNICAL FIELD

This invention relates generally to the circuit design field, and more specifically to a new and useful system and method for modular printed circuit board design in the circuit board field.

BACKGROUND

While discrete, modular tiles (that removably plug into a carrier board) are useful for micro-scale device prototyping applications, these tiles are impractical and become very expensive for larger scale production. To rectify these drawbacks, it is often desirable to merge these circuits into a single unified PCB. However, conventional circuit design systems and methods lack an easy, automated way of merging the circuitry of the discrete, modular tiles into a unified circuit while preserving the functionality and test validity for each circuit. Conventionally, this integration is performed manually, requiring complete re-design of the circuitry and re-testing of the entire system.

Thus, there is a need in the circuit design field to create a new and useful system and method for automatic PCB design generation from a set of discrete, modular circuits. This invention provides such new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
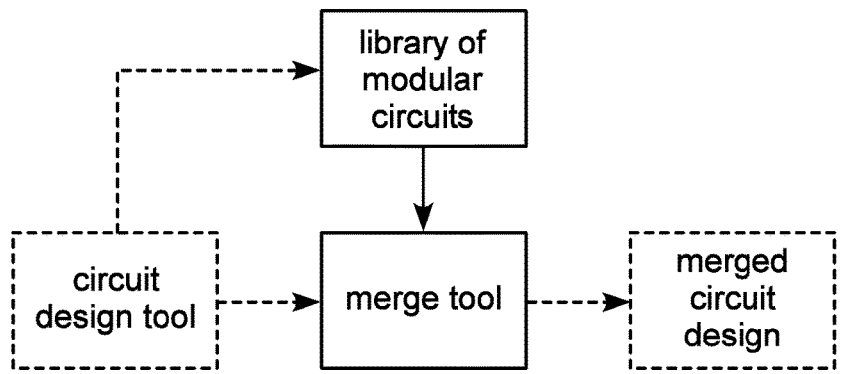
FIG. 1 is a schematic representation of the system.
Figure 7:
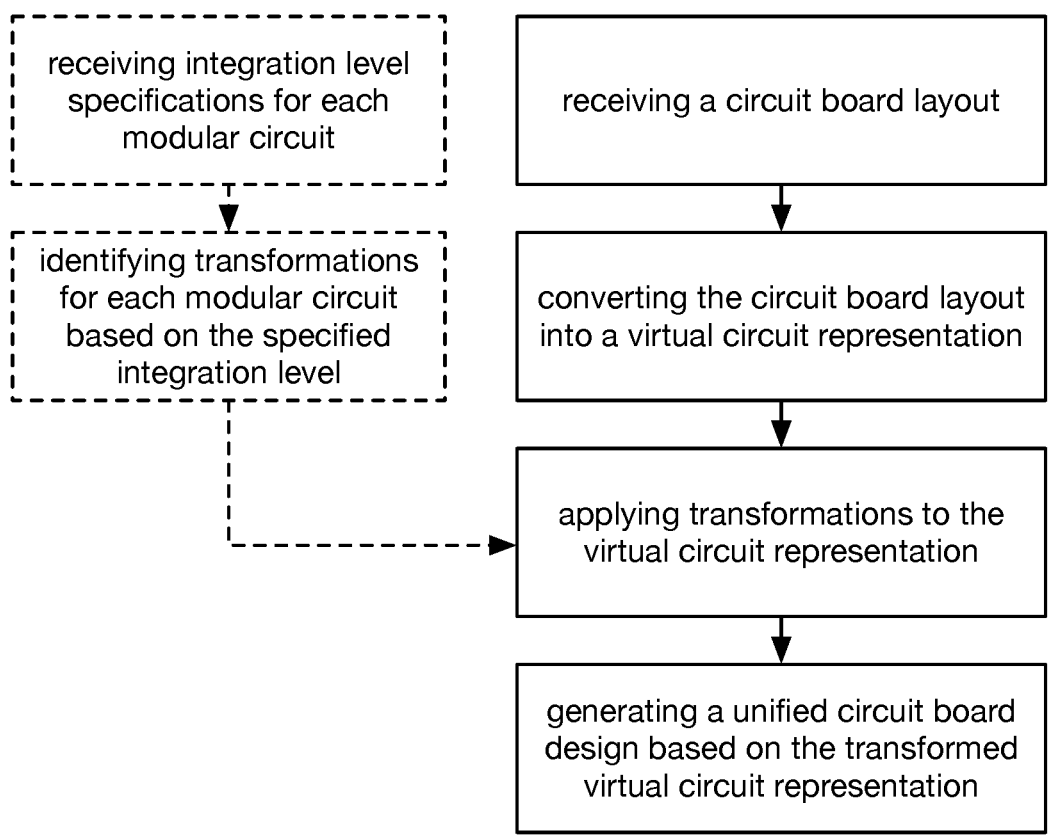
FIG. 7 is a schematic representation of the method.

As shown in FIG. 1, the system for dynamic circuit board design includes a library of modular circuits and a merge tool. As shown in FIG. 7, the method for merging modular circuitry into a unified (e.g., integrated) electronics module (e.g., PCB, PCB assembly, monolithic integrated circuit, etc.) includes: receiving a circuit board layout, the circuit board layout including a set of modular circuits arranged on a virtual carrier board; converting the circuit board layout into a virtual circuit representation; applying transformations to the virtual circuit representation; and generating a unified circuit board design (and/or monolithic integrated circuit design) based on the transformed virtual circuit representation.

Figure 4:
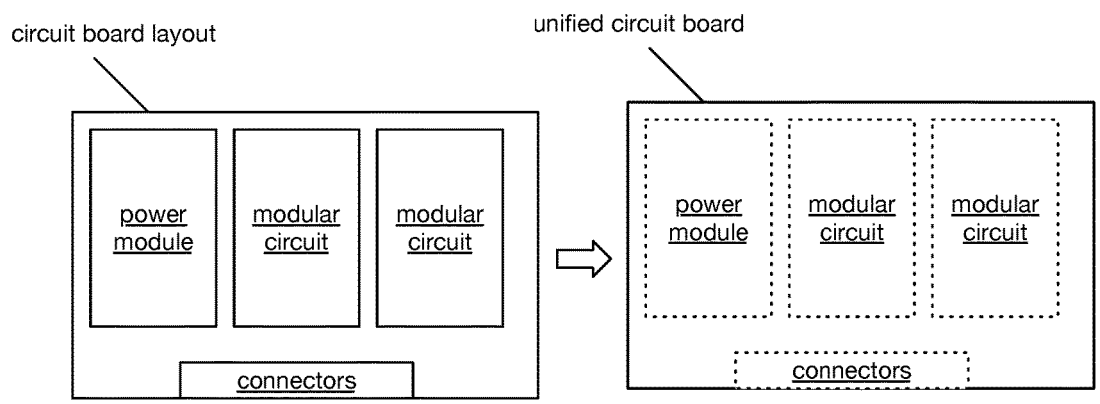
FIG. 4 is a schematic representation of an example of the input and output of the system and/or method.

The system and method function to enable dynamic integration of pre-designed modular circuits into one or more unified electronics modules (example shown in FIG. 4). This allows different modular circuits, which were independently designed and independently tested, to be merged into a common module (e.g., PCB assembly, integrated circuit, etc.), where the unified modular circuits retain their functionality and testing validity.

The system and method can additionally function to integrate different modules to different degrees (integration levels). For example, a first module can be fully unified with (e.g., integrated with, printed into, having unitary fabrication with, etc.) the carrier board, a second module can be surface mounted to the carrier board adjacent the first module (e.g., using castellations), and a third module can be a physically separate circuit board (discrete board) plugged into pins extending from the carrier board (e.g., adjacent the second module).

In an example of system and/or method application, a prototype device can be constructed from a set of discrete boards, wherein each board supports a different modular circuit. In a specific example, each discrete board can be plugged into pins on a carrier board, connected with mechanical connectors (e.g., PCI cards, using shields, etc.), or otherwise connected together. After prototype finalization, the system and/or method can be applied to the finalized device design to merge the circuitry of each board into the carrier board, thereby creating a unified electronics module (e.g., circuit board) design (e.g., a CAM file) that includes all modular circuits of the prototype device (or a subset thereof). This design can be used for small-, mid-, or large-scale production of the device.

2. Benefits

Merging modular circuitry into a unified electronics module is not as simple as merely copying and pasting the circuits into a predefined, non-overlapping footprint—several challenges must be resolved before a functional automated system and method is achieved.

First, circuit board layouts are conventionally described in different ECAD (Electronic CAD) file formats. This becomes problematic when different modular circuit designs are to be merged into a common unified circuit, particularly when the modular circuit designs are crowdsourced (e.g., different designs are created by different individuals using different formats). These ECAD formats are mutually incompatible, so different circuits represented in different formats cannot be combined into a single design. This invention homogenizes these mutually-incompatible designs into a single representation that can be merged together.

Second, different transformations need to be applied to the tile circuit designs before the designs can be merged. For example, discrete designs would have an outline layer causing the circuit board fabricator to route out the edges of the design. When the designs are merged, this layer would need to be removed. This invention automatically identifies the requisite transformations for a given circuit design, and automatically applies the identified transformations to the tile circuit designs during the merging process.

Third, because transformations will need to be applied to the designs in order to allow them to be merged together, it is important that there be an internal representation of the circuit board in a way that makes writing and executing transformations efficient. This invention transforms the circuit designs into a hierarchical virtual representation that allows the transformations to be easily applied to the design. The hierarchical virtual representation also enables the disparate circuit designs to be automatically merged together, and for the merged representation to be flattened into a final, unified circuit design.

Fourth, circuit components (e.g., resistors, microprocessors, etc.) are conventionally referenced by part number (e.g., manufacturer SKU) in circuit designs. This makes it difficult for comparable replacement components to be used during circuit manufacture. This also makes it difficult to determine whether components can be merged into a single component type (e.g., SKU) with comparable performance and functionality. In some variants, this system and method represent the circuit components by component parameter value, which enables the system to determine replacements for an unavailable (e.g., out of stock) component, eliminate redundant components, and/or determine how to reduce component type count (e.g., reduce BOM item count to optimize cost savings) by replacing multiple different components with a single component type with comparable performance and functionality.

Figure 12:
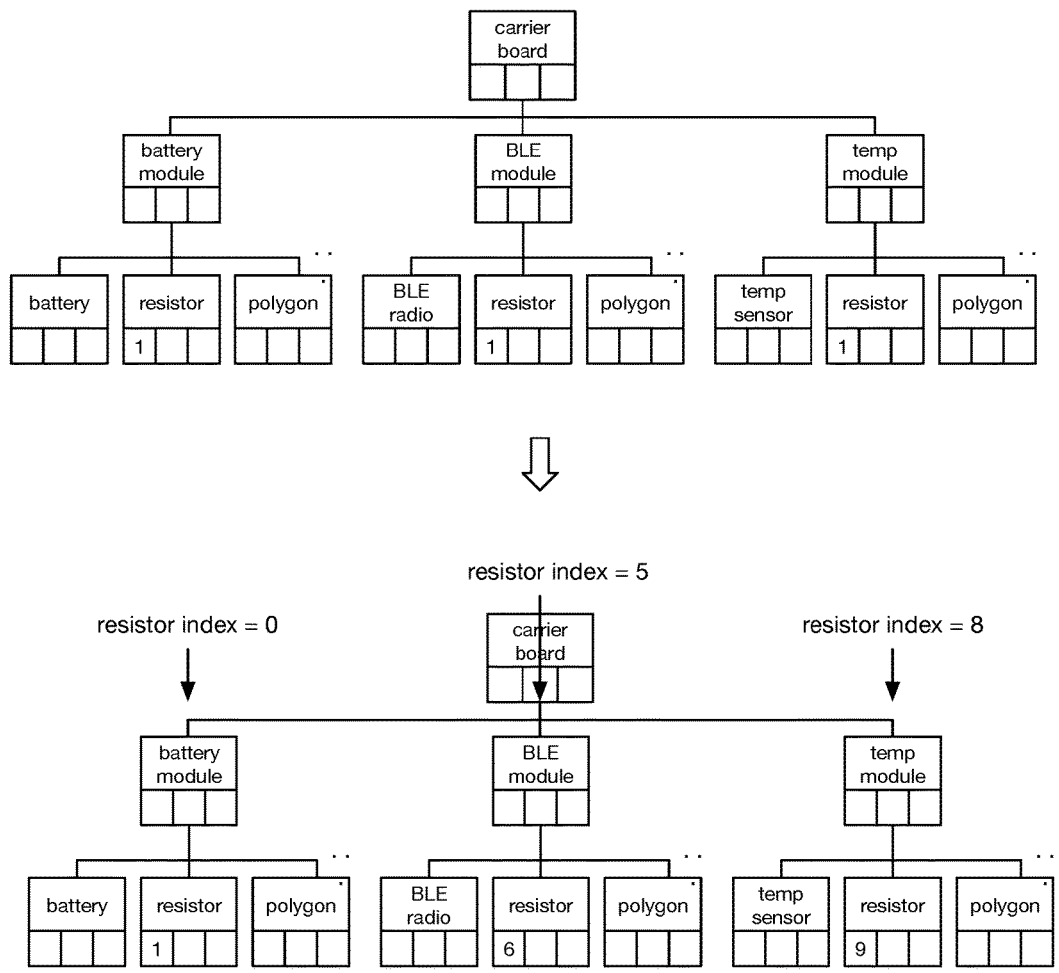
FIG. 12 is a schematic representation of an example of renaming elements within the circuit.

Fifth, circuit components (e.g., resistors, capacitors, integrated circuit packages, etc.) of different modular circuits will typically use common identifiers, such as indexed identifiers starting at 0 or 1 (e.g., "$R_0$" or "$R_1$" for the first resistor, "$C_0$" or "$C_1$" for the first capacitor, etc.). These common identifiers can result in non-unique component identifiers when multiple modular circuits are merged together (e.g., the first resistors of two different modules will both be called "$R_1$"). In some variants, this system and method include renaming the component identifiers, thus ensuring that the identifiers are unique (e.g., as shown in FIG. 12). However, the system and/or method can additionally or alternatively confer any other suitable benefits.

3. System.

As shown in FIG. 1, the library of modular circuits functions to provide a plurality of options for device prototyping. The library is preferably a virtual library of modular circuit designs, but can alternatively be a physical library of modular circuits (e.g., tiles). The modular circuit designs can be received from one user account, multiple user accounts, or any suitable number of user accounts. The modular circuit designs can be represented in ECAD, ECAM, a hierarchical representation, or otherwise represented.

Figure 3:
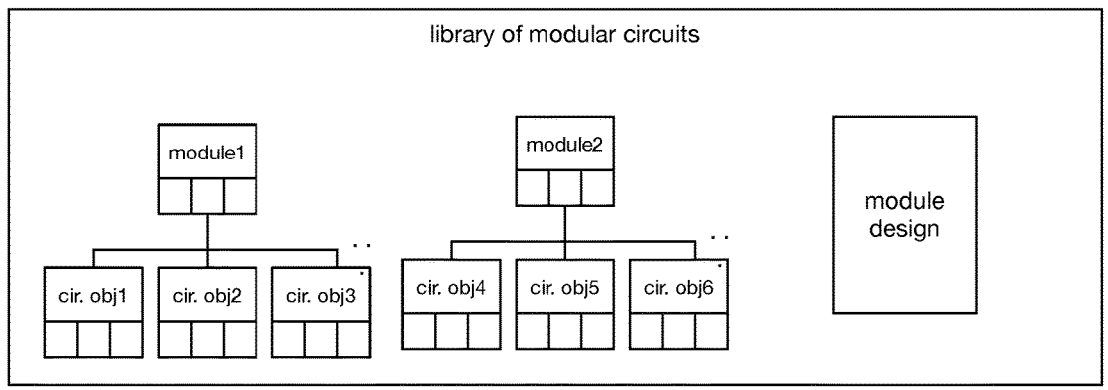
FIG. 3 is a schematic representation of an example of the library with representations of different modular circuits.

As shown in FIG. 3, the modular circuit designs preferably include a set of circuit objects, but can be otherwise configured. A circuit object functions to represent a circuit element. Each circuit object can include its own set of circuit objects, or include no sub-objects. Examples of circuit elements that the circuit objects can represent include: the unified circuit, the modular circuits (e.g., circuit block), electronic components (e.g., resistor, capacitor, microcontroller, etc.), pad stacks, pins, lines (e.g., wires, arcs, circles or holes, polygons, etc.), text, or any other suitable circuit assembly or sub-assembly.

Each circuit object is preferably associated with a set of attributes (examples shown in FIG. 10), but can additionally or alternatively be associated with any other suitable set of metadata. Examples of attributes include: the circuit object origin, a bounding box (e.g., defining the boundaries of the circuit element represented by the circuit object), an internal coordinate frame (e.g., defined using an Affine transformation), a relative coordinate frame or internal coordinate frame transformation (e.g., an outside coordinate frame, such as the internal coordinate frame of a parent object), a location (e.g., within the relative coordinate frame), a rotation (e.g., relative to the reference coordinate frame), manufacturing data (e.g., manufacturing method, manufacturing parameters such as feed rate, etc.), orientation (e.g., relative to a layer normal vector), dimensions (e.g., width, length, height, diameter), component parameters and/or parameter requirements (e.g., logical requirements, such as resistance value, capacitance value, precision, package size, etc.; part number; assembly variant; etc.), whether the node is a primitive element (e.g., whether the node has children or is a leaf node), other nodes associated (e.g., other than by node descendance and/or ancestry) with the node (e.g., text nodes associated with a component node, such as legend nodes to be printed on the PCB to identify the component to be inserted), component identifier (e.g., number and/or alphanumeric string, such as $R_1$, $R_{10}$, $C_{10}$, etc.), integration level (e.g., plugin, surface mount, unified, etc.), or any other suitable attribute. Component parameters can include exact values (e.g., required or target parameter value), value ranges (e.g., range of acceptable parameter values, such as a range of resistances or capacitances), minimum and/or maximum values (e.g., lowest-acceptable precision, such as of a resistance or capacitance value; maximum resistance, such as of an electrical connection; etc.), and/or can be specified in any other suitable manner. Each circuit object can be associated with an object class (e.g., circuit element, such as a resistor, capacitor, inductor, transistor, op-amp, IC package, wire, etc.; circuit block; etc.) or be unclassified. Circuit objects with different object classes can be associated with different attributes and/or attribute values. Each attribute can be associated with a manufacturing layer, which can be a numbered layer (e.g., increasing from top to bottom, bottom to top, interior to surface, surface to interior, etc.), a material layer (e.g., component placement, top copper, ink or silkscreen, photoengraving, milling/drilling/machining, laser resist ablation, lamination, etching, etc.), and/or with any other suitable metadata. In one example, the system can filter or sort attributes by manufacturing layer when generating the CAM or CAD for the unified circuit.

In a first example of a circuit object, a modular circuit can be represented by a circuit object associated with a circuit block class and a first set of attributes (e.g., bounding box, circuit object origin, and coordinate frame relative to the origin) and a set of circuit sub-objects, each associated with a component class and an individual set of attributes (e.g., component parameter requirements, location relative to the circuit block's coordinate frame, dimensions, and manufacturing data). The circuit sub-objects can include polygon circuit objects for the pads (e.g., associated with a metal layer, bounding box, and position), line circuit objects for the wires (e.g., associated with a metal layer, position, length, and width), line circuit objects for silkscreen outlines (e.g., associated with a silkscreen layer, position, length, and width), text circuit objects for the reference labels (e.g., associated with a silkscreen layer, bounding box, position, and text values), resistor circuit objects for the resistors (e.g., associated with a component placement layer, position, bounding box, component parameter requirements, and a text circuit object), capacitor circuit objects for the capacitors (e.g., associated with a component placement layer, bounding box, position, component parameter requirements, and a text circuit object), processor circuit objects for the processor (e.g., associated with a component placement layer, bounding box, position, component parameter requirements, and a text circuit object), and/or any other suitable circuit object.

In a second example of a circuit object, a wire can be represented as a metal line, while a cut can be a line associated with a cutting operation. In a third example of a circuit object, holes (e.g., through holes, blind holes, vias, etc.) can be empty circles and/or can be circles (and/or circle centers) associated with a drilling operation. However, different circuit elements can be otherwise represented by the circuit object or by any other suitable virtual representation.

Some or all circuit elements (e.g., some or all discrete component elements) and/or characteristics thereof can be associated with one or more assembly variants. Thus, the circuit representation can accommodate fabrication of multiple related circuits. For example, different assembly variants can accommodate I/O between 0-5 V, 0-10 V, and 0-20 V, and/or one assembly variant can accommodate a current signal input whereas a second can accommodate a voltage signal input. In one example, one resistor element ('$R_1$') can include a first resistance value associated with a first assembly variant and a second resistance value associated with a second assembly variant, while another resistor element ('$R_2$') can include a third resistance value associated with the first assembly variant and an 'omit component' characteristic associated with the second assembly variant. When the first assembly variant is specified, a first BOM, including the first resistance value associated with $R_1$ and the third resistance value associated with $R_2$, can be generated; when the second assembly variant is specified, a second BOM, including the second resistance value associated with $R_1$ and an 'omit' callout associated with $R_2$, can be generated. Circuit elements designated for use in all assembly variants can be associated with all the assembly variants (e.g., the node can include a reference to each assembly variant), no assembly variants, and/or be denoted in any other suitable manner. However, assembly variants can additionally or alternatively be accommodated in any other suitable manner.

The library can optionally include one or more protected (e.g., regulated) modules designated for special treatment. For example, modules corresponding to FCC certified devices can be designated as such, and the circuit specifications can be protected (e.g., designated not to be changed, designated to be isolated to its own package or PCB, etc.) in order to ensure adherence to the certification (e.g., such as described below regarding the method). Multiple protected modules (e.g., a through-hole technology module, a surface-mount technology module, and a packaged IC module; a square module and a narrow, elongated module; etc.) with equivalent functionality can be designated as equivalents, thereby enabling the method to select between the equivalent protected modules based on design requirements and/or desires.

Figure 6:
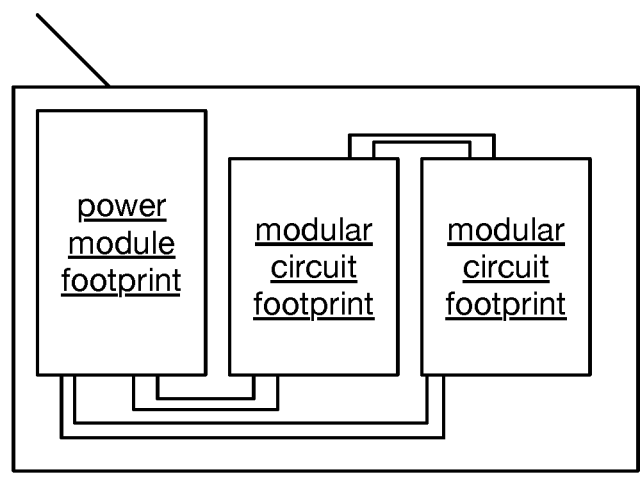
FIG. 6 is a schematic representation of an example of a carrier board.

The library can optionally include a set of carrier board designs (example shown in FIG. 6). The carrier board designs preferably define a set of standard footprints for the modular circuits, wherein the modular circuits are preferably designed to fit within the standard footprint. The standard footprints are preferably separate, discrete, and non-overlapping on the carrier board, but can alternatively overlap, be contiguous, or be otherwise configured. The library can include one or more carrier board designs. The carrier boards can be represented as a circuit object (e.g., with a bounding box, reference coordinate system, origin, etc.), or be otherwise represented.

The library can optionally include a set of adapters, which function to adapt a modular circuit to a larger footprint. This allows individual modular circuits to be created without excess wasted space, while still maintaining the ability for the modular circuit to be used across a wide range of applications. For example, a designer can select a footprint (e.g., largest, smallest) that the device design can accommodate, design the circuit (e.g., on any footprint), and the system can automatically determine the respective footprints of the constituent modular circuits (e.g., using a cost optimization algorithm, space optimization algorithm, etc.) to fit the specified footprint. In one example, the system can identify the smallest form factor for each modular circuit, then iterate through different combinations of modular circuits and adapters until the overall footprint is within the specified footprint. However, the adapters can be otherwise used.

Figure 8:
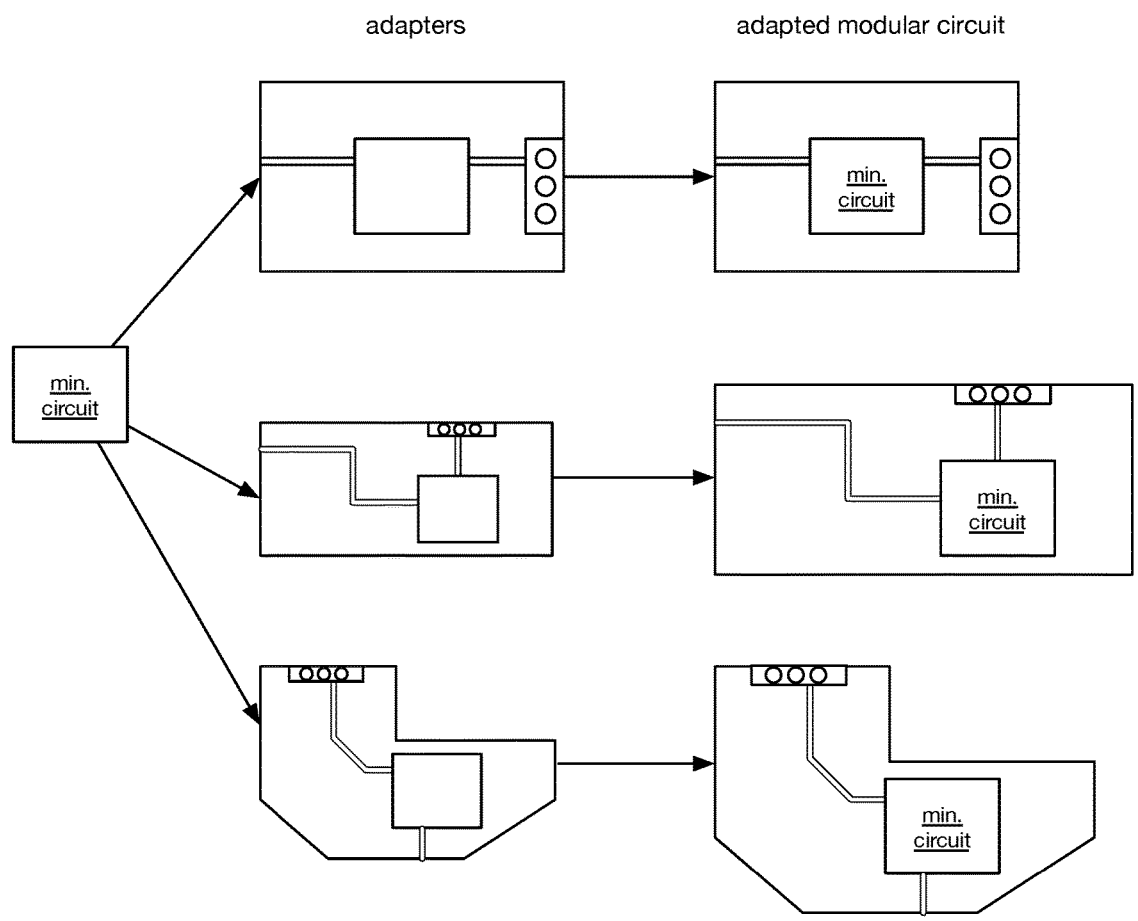
FIG. 8 is a schematic representation of an example of adapters for a modular circuit.

Each modular circuit is preferably associated with a set of adapters, but can alternatively be associated with a single adapter or no adapter. As shown in FIG. 8, each adapter is preferably configured to adapt the modular circuit to a different predetermined footprint (standard footprint, standard package size, standard design with standard pinout locations, etc.), but can alternatively or additionally adapt the modular circuit to a different integration level (e.g., tile versus surface mount versus unified circuit) or adapt the modular circuit in any other suitable manner.

The adapters can be automatically generated, manually generated, or otherwise generated. In one variation of an automatically-generated adapter, the system identifies the pinouts of the modular circuit, identifies the corresponding pinouts of the larger footprint (e.g., the target design that the modular circuit is to be adapted to), and automatically links the modular circuit pinouts to the standard footprint pinouts with a set of wires (e.g., leads) and/or conductive pads (e.g., metal-coated polygons), avoiding collisions and crossovers, removes the modular circuit pinouts, and merges the modular circuit wires and/or pads with the adapter wires. In a second variation, the system identifies the modular circuit pinouts, identifies the locations for the corresponding standard footprint pinouts, and extends the wires connected to the modular circuit pinouts on the modular circuit until the modular circuit pinouts coincide with the standard footprint pinouts. However, the adapter can be otherwise automatically generated.

The library can optionally include power blocks (e.g., associated with power ratings, power types, such as continuous or intermittent, or any other suitable power supply parameter), processing systems (e.g., microprocessors, GPUs, CPUs, etc.), or any other suitable computing element.

The library can optionally include test jigs associated with each modular circuit. The test jigs can be automatically determined, manually determined, or otherwise determined. The test jigs can also be associated with adapters, similar to the manner described above, or have a standard size. The test jigs can also be virtually represented in a similar manner to modular circuit representation, but can be otherwise represented. The test jigs can be merged into a single jig for the unified circuit using the methods described for merging the modular circuits together, as described below, or be otherwise merged. In one variation, the carrier board for the merged test jigs can include a switch matrix that allows a user to switch between individual test jigs on the merged jig, such that individual modular circuits can be tested on the merged circuit (e.g., unified circuit, integrated circuit, etc). However, the test jigs can be otherwise used and/or manipulated.

The merge tool of the system preferably functions to merge the modular circuits into a unified circuit (or set of associated circuits). In variants, the merge tool can: translate ECAD modular circuit designs into a hierarchical representation, transform the circuit objects and/or attributes thereof based on a selected integration level for the modular circuit, flatten the hierarchical representation to generate the unified circuit design, and/or translate the unified circuit design into an ECAD or CAM circuit design for unified circuit design manufacture.

The merge tool can include: translation modules, transformation modules, virtual circuit board representation(s), or any other suitable module.

Figure 2:
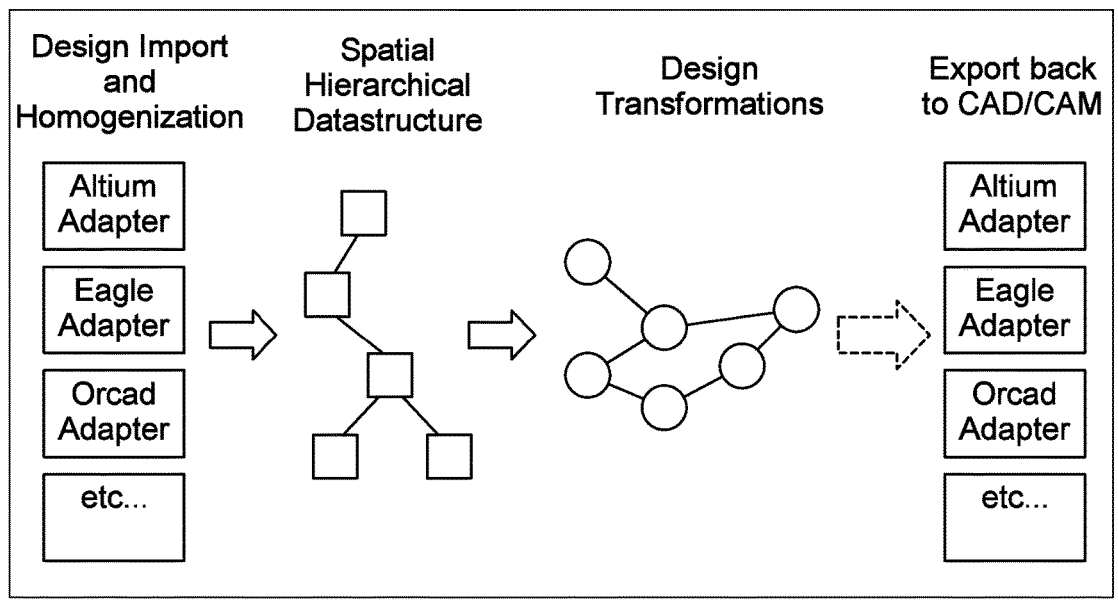
FIG. 2 is a schematic representation of an example of the system.

The translation modules translate the ECAD/CAM formats into the circuit object format, and are preferably specific to each ECAD/CAM format but can alternatively be generic (example shown in FIG. 2).

The transformation modules function to apply transformations to the modular circuits into a unified circuit. The transformation modules preferably operate on the hierarchical circuit representation (including one or more circuit objects), but can alternatively operate on the circuit object themselves, the attributes of the circuit objects, or on any other suitable variable. In one variation, the merge tool can include a different transformation module for each integration level. Integration levels can include: tile (e.g., discrete, pluggable board), surface mount (e.g., with flat pins that solder to the carrier board), unified circuit (e.g., unitary fabrication with the carrier board), or include any other suitable integration level. In a second variation, the merge tool can include a different transformation module for each type of transformation. For example, a renaming module can rename all circuit components, while a redundancy module can remove all duplicate elements (e.g., layers, contacts, etc.). However, the transformation modules can be otherwise defined. The transformation modules can be applied to the virtual circuit board representation as a whole, to a sub-portion of the virtual circuit board (e.g., a branch of the hierarchical circuit representation), to a circuit object, or to any other suitable portion of the circuit board. The transformation modules can be applied concurrently (e.g., in parallel), serially (e.g., according to a predefined order, in a random order, etc.), or in any other suitable order. In one example, the application order can be: the redundancy module first, the rotation and translation module second, and the renaming module third. However, any other suitable transformation module can be applied in any other suitable order.

The virtual circuit board representation functions to represent the circuit board in a manner that can be easily transformed, and to homogenize circuit designs from different sources into a common representation. The virtual circuit board representation is preferably a hierarchical representation (e.g., a tree, such as a binary tree, B-tree, heap, multiway tree, space-partitioning tree, such as a quadtree, k-tree, or octree, application-specific tree, etc.), but can alternatively be a list (e.g., a flat list, linked list, etc.), an array, a graph, a hash, or have any other suitable structure. A hierarchical representation can be useful for compositions of circuit layouts (e.g., compositions of multiple modular circuits) and for efficient design querying and transformation. The nodes of the hierarchical representation are preferably circuit objects, but can alternatively be any other suitable data object. The nodes preferably represent physically proximate collections of circuit elements, but can alternatively represent pre-defined collections of circuit elements (e.g., a pre-defined modular circuit or circuit block), or be otherwise defined. Children nodes are preferably spatially grouped (e.g., to allow for efficient spatial querying), but can alternatively be grouped according to pre-defined groups or otherwise grouped. Attributes of parent nodes are preferably propagated throughout the children nodes (e.g., the rotation or location of the parent node in the overall layout influences the rotation or location of the children nodes in the overall layout), but can otherwise influence the children nodes.

In one example, the unified circuit board can be represented by a root node, the constituent modular circuit can be represented by children nodes of the root node, and each constituent element of the modular circuit can be represented by a child node of the respective modular circuit node. Siblings can be arranged spatially within the tree (e.g., with the modular circuit assigned to a first pre-defined footprint on a carrier board arranged at the rightmost or leftmost branch of the tree) or otherwise arranged. In an example of the latter, each modular circuit node can include a footprint assignment as an attribute. The virtual circuit board representation can be automatically generated, manually generated, or otherwise generated. However, the system can include any other suitable element.

4. Method.

As shown in FIG. 7, the method of automatically merging a set of modular circuits into a unified circuit includes: receiving a circuit board layout, the circuit board layout including a set of modular circuits arranged on a virtual carrier board; converting the circuit board layout into a hierarchical representation; applying transformations associated with a selected integration level to the hierarchical representation; and generating a unified circuit board design (and/or integrated circuit design) based on the transformed hierarchical representation. The method functions to merge multiple disparate circuits (and/or circuit elements) together. The method is preferably entirely or partially automatically performed, but can be otherwise performed. The processes of the method can be performed serially, in parallel, or in any suitable order for one or more unified circuits. The method is preferably performed using the system described above, but can be performed by any other suitable system.

Figure 5:
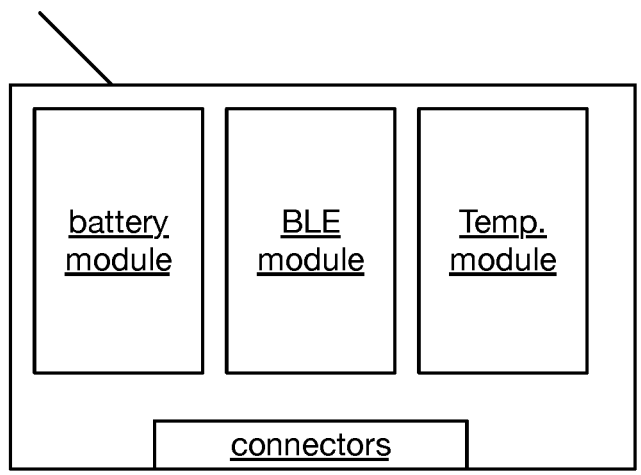
FIG. 5 is a schematic representation of an example of a circuit board design.

Receiving a circuit board layout functions to identify the modular circuits to be merged together. The circuit board layout (example shown in FIG. 5) preferably includes a set of modular circuits spatially arranged on a virtual carrier board, and can optionally include electrical connections between the modular circuits and/or carrier board elements (e.g., routed electrical connectors, electrical connector rats nest, list of necessary and/or desired connections, etc.) and/or information enabling determination of the connections (e.g., standardized electrical terminal locations and roles, specification of custom electrical terminal roles, etc.). For example, all +5 V input terminals can be electrically connected to a single +5 V supply terminal of a power module, and each data output terminal can be electrically connected to its own data input terminal of a processing module. However, the circuit board layout can additionally or alternatively include a list of modular circuit identifiers (e.g., with or without interconnections and/or indications thereof, such as described above), a state diagram, or include any other suitable circuit board design representation. The circuit board layout can be received from a user, automatically generated (e.g., based on device specifications received from a user, based on a set of rules, based on an optimization analysis and the set of rules, etc.), or otherwise generated. An example of automatic circuit board layout generation can include: identifying the modular circuits to be merged (e.g., based on device specifications), wherein each modular circuit is associated with a power requirement; selecting a power module from a set of available power modules based on the collective modular circuit power requirements and/or the device specifications (e.g., selecting a rechargeable battery module for transient use, selecting a wall plug module for installation); selecting a processing module from a set of available processing modules based on the device specifications (e.g., based on a required number of processing module data inputs and/or outputs, based on a required performance level, based on an anticipated processing load, etc.); selecting a carrier board based on the largest device footprint (determined from the device specifications) and the minimum footprint of the selected power module, processing module, and identified modular circuits, wherein the carrier board includes a set of pre-defined power module, processing module, and modular circuit footprints; automatically associating (e.g., arranging on) the modular circuits with the modular circuit footprints, the processing module with the processing module footprint, and the power module with the power module footprint; determining an identifier for the leads of each modular circuit, processing module, and power module; and generating virtual wires connecting matching leads together (e.g., connecting all ground leads to an electrical ground and/or merging all ground planes into a unitary ground plane, connecting modular circuit outputs to processing system inputs, etc.). However, the circuit board layout can be otherwise automatically generated.

Figure 9:
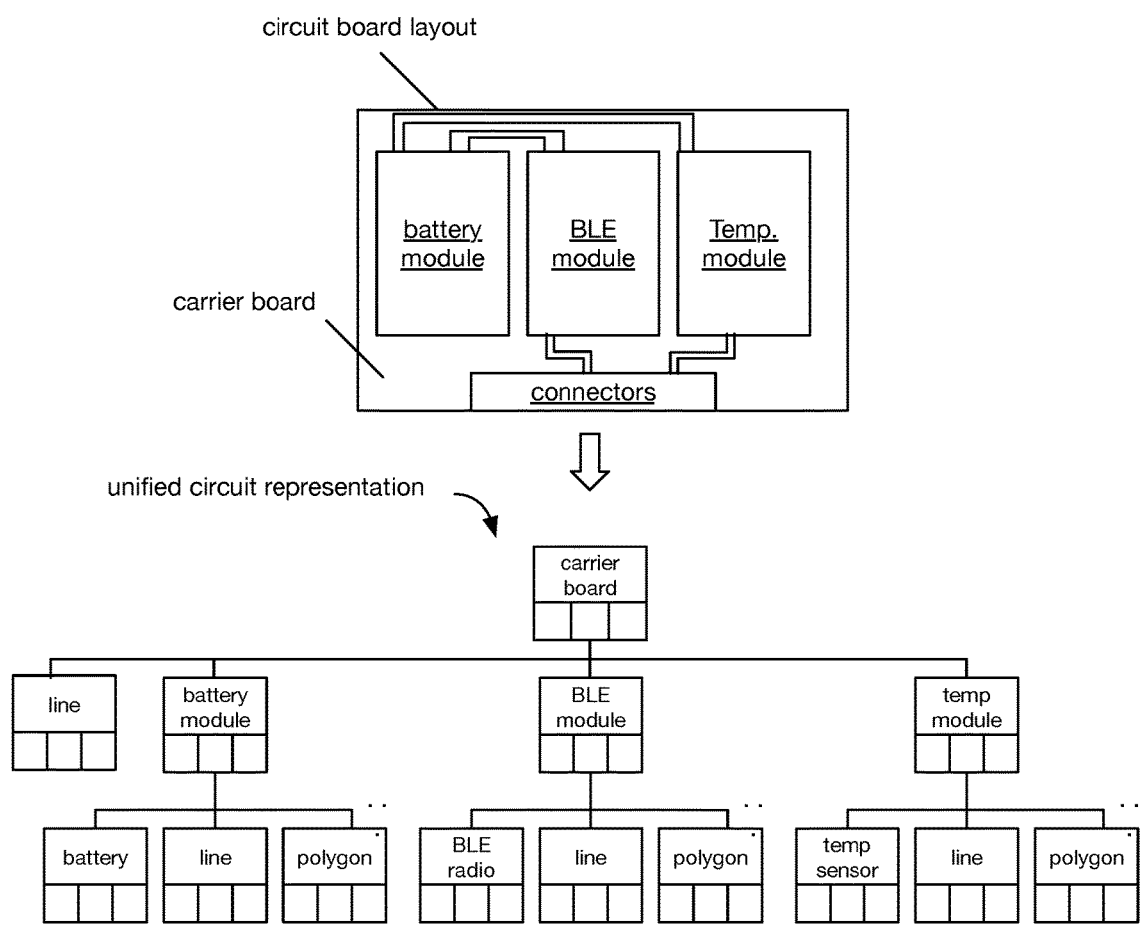
FIG. 9 is a schematic representation of an example of virtual circuit representation generation.

Converting the circuit board layout into a virtual representation functions to generate a virtual data structure representative of the circuit board (example shown in FIG. 9). The virtual representation is preferably a hierarchical representation, more preferably a tree structure, but can be any other suitable data structure. The circuit board layout is preferably automatically converted into the virtual representation, but can be otherwise converted into the virtual representation. Automatic virtual circuit board representation generation can be performed using binary space partitioning (BSP), hierarchical clustering, or any other suitable method.

Figure 10:
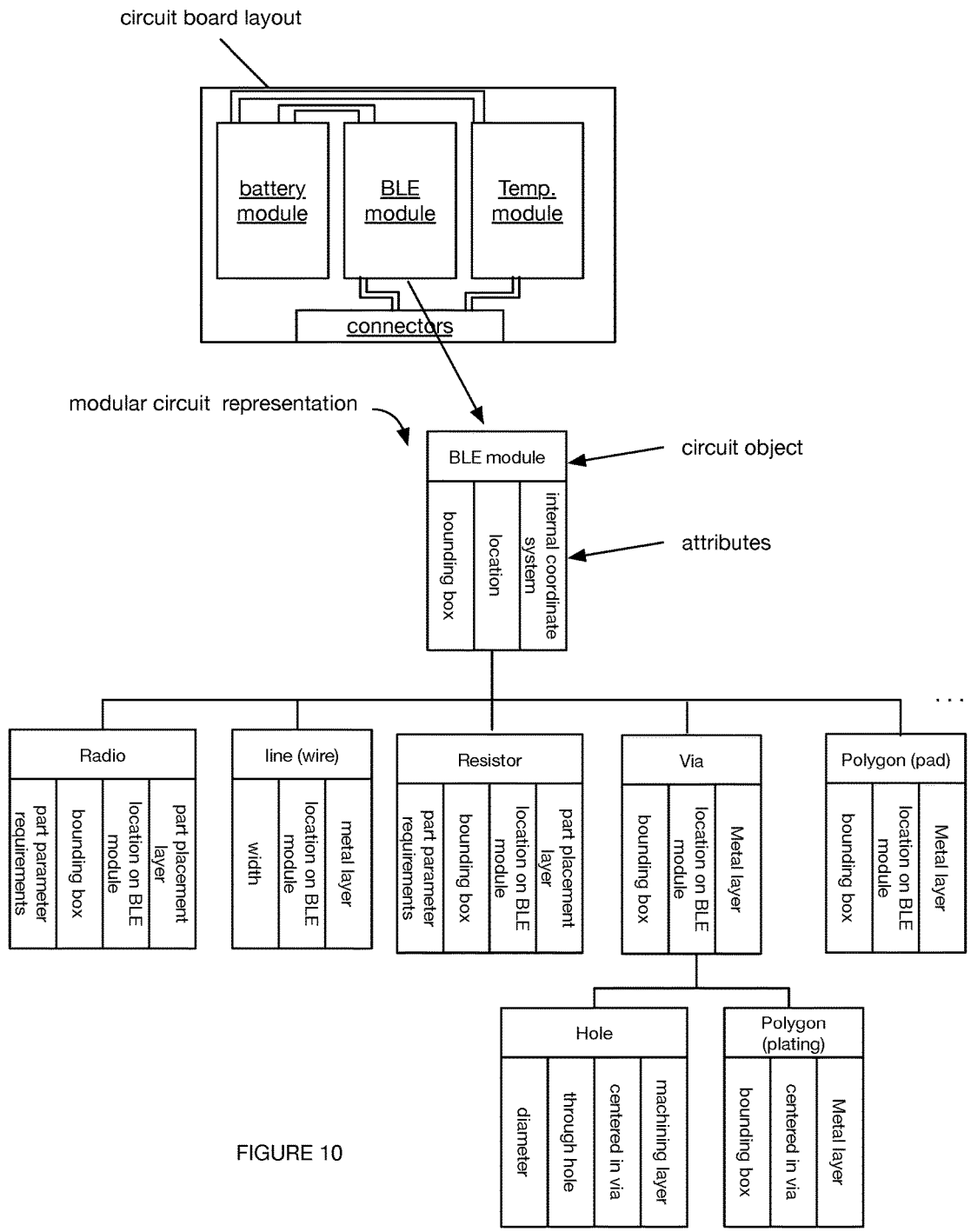
FIG. 10 is a schematic representation of an example of modular circuit representation.

In one variation, the hierarchical circuit board representation for a unified circuit can be automatically generated from pre-defined hierarchical representations of the constituent modular circuits (modular circuit representations), example shown in FIG. 10. The modular circuit representations can be generated automatically (e.g., using the second variant below), generated manually, or otherwise generated. In this variation, each modular circuit representation includes a tree with a root node representing the modular circuit and the children nodes representing the constituent elements of the modular circuit. The system automatically identifies the modular circuit trees associated with the unified circuit and appends the identified modular circuit trees to the unified circuit root node as children branches to form the unified circuit tree. The system can additionally modify the attributes of the modular circuit tree root node based on the modular circuit's attributes in the unified circuit. For example, the system can assign the unified circuit coordinates as the node's reference coordinate frame, assign a location value representative of the modular circuit location in the unified circuit, or otherwise modify the modular circuit's root node attributes. The system preferably does not modify the modular circuit tree's children nodes during the initial unified circuit tree creation process, but can alternatively modify the children node attributes, connections, or otherwise modify the children nodes.

In a second variation, the hierarchical circuit board representation (e.g., for a modular circuit, for a unified circuit board system) can be automatically generated from a flat list, ECAD design, or from another circuit design representation. In this variation, the system can automatically: identify individual elements of the design (e.g., lines, holes, components, etc.), create a circuit object for each identified element, determine the attributes of each individual element from the source design representation, assign the determined attributes to the respective circuit object, and nest the resultant set of circuit objects under a root node representative of the design.

In a specific example, vias or stacks of elements matching a predetermined stack associated with a via can be identified in the circuit design representation and represented as a pad stack circuit object, wherein the pad stack circuit object includes a child hole circuit object (e.g., associated with a machining layer, a first diameter, and a via location), and a shape (e.g., polygon, circle, etc.) circuit object (e.g., associated with a metal layer, a second diameter, and the via location). When the hierarchical representation is flattened, this pad stack can be translated into a first machining layer including a hole in the via location having the first diameter and a second metal layer including a circle in the via location having the second diameter, which cooperatively forms a plated via. However, different circuit elements can be otherwise identified and represented.

However, the hierarchical circuit board representation can be otherwise generated.

Applying transformations to the virtual representation functions to modify the constituent elements of the circuit board to enable the elements to be merged. Transformations can additionally or alternatively be applied to minimize component count (e.g., component type count), minimize cost, minimize overall size (e.g., optimize spatial arrangement), or for any other suitable purpose. The method can include applying one or more transformations. The transformations can be applied to the entire unified circuit virtual representation, to a branch of the unified circuit virtual representation, to a circuit object (e.g., a circuit element, an object representing the modular circuit, etc.), to a circuit attribute, or to any other suitable portion of the unified circuit virtual representation.

The transformations are preferably automatically determined and applied, but can be manually specified or otherwise determined. For example, transformations applied each modular circuit branch can be specific to the integration level associated with that branch. In a specific example, a first set of transformations associated with full integration are applied to modular circuit branches with a unified circuit integration level, while a second set of transformations associated with surface mounting are applied to modular circuit branches with a surface mount integration level. The first set of transformations (associated with full integration) can include: propagating the modular circuit node's location within the unified circuit design throughout the children nodes; removing the routing layer (e.g., after the tree is flattened, removing a machining layer or value associated with line circuit objects, etc.); removing duplicate elements (e.g., removing pads or wires from the carrier board that are shared with the modular circuit); and renaming elements across different modular circuit branches. The second set can include propagating the modular circuit node's location within the unified circuit design throughout the children nodes and renaming elements across different modular circuit branches. However, the sets can include any other suitable set of transformations. However, the transformations can be otherwise applied.

Figure 11:
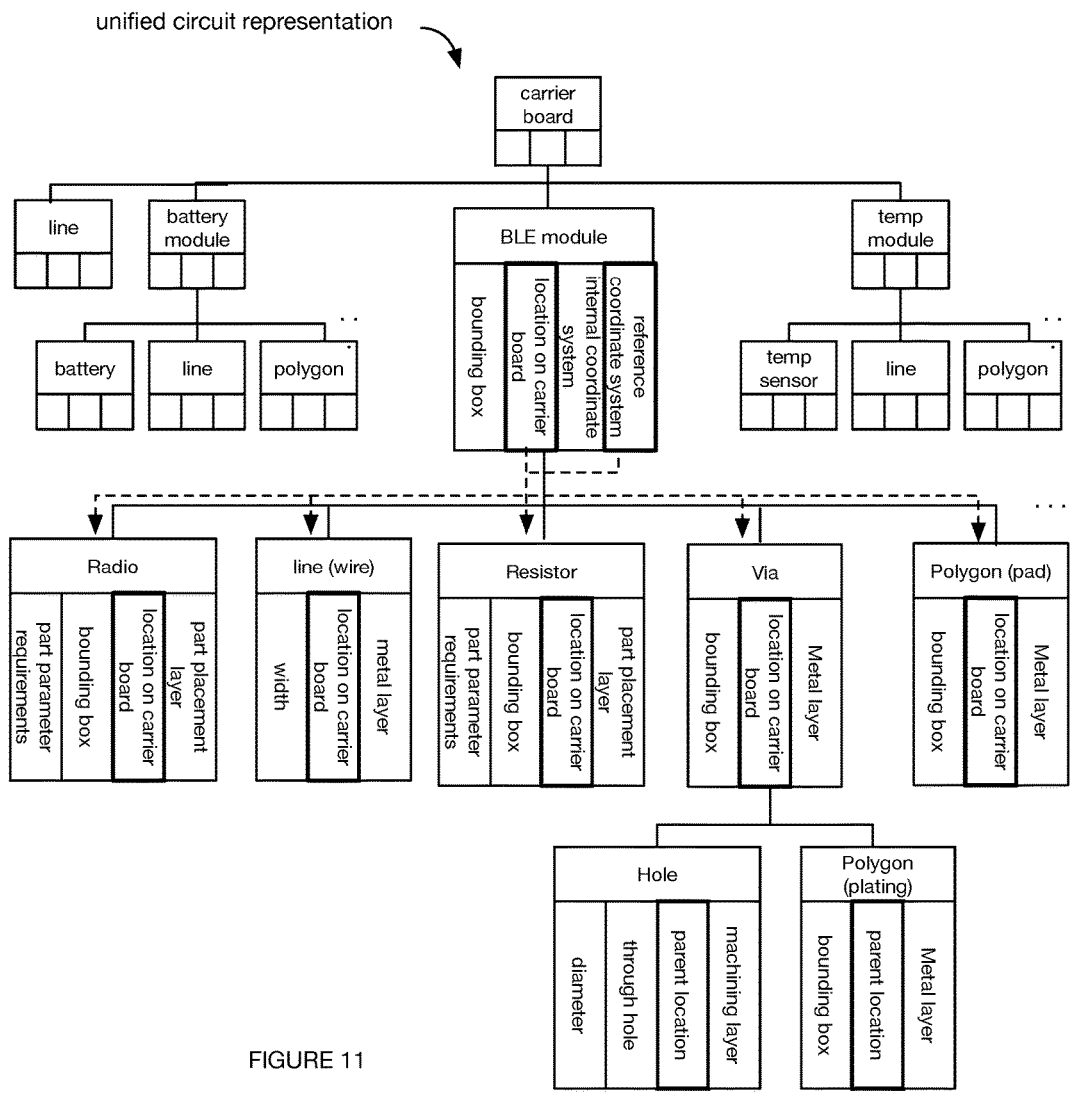
FIG. 11 is a schematic representation of an example of determining the positions of the circuit elements within the unified circuit design.

In a first variation, applying a transformation includes determining the positions of the circuit elements within the unified circuit design (example shown in FIG. 11). This transformation can be applied to all branches of the virtual circuit representation in parallel, serially, or in any suitable order. Determining the circuit element positions can include: rotating the element, moving the element within a layer, moving the element across layers, changing the reference coordinate system of the element, or otherwise adjusting the circuit element position. In one embodiment, this includes adjusting the position attributes of child nodes based on the position attributes of a parent node. Adjusting the position attributes of child nodes based on the position attributes of a parent node can include: changing the reference coordinate system of the children nodes to the reference coordinate system referenced by the parent node; transforming the internal coordinate system of the children node based on the new reference coordinate system; changing the location of the children nodes based on the location of the parent node and the original location of the children node; adjusting the rotation of the child node based on the rotation of the parent node (e.g., wherein rotating the element represented by the child node by an additional 90° when the parent node is rotated 90°); or otherwise adjusting the child node position attributes based on the parent node's position attributes.

In one example, positioning the circuit elements within the unified circuit design includes propagating a modular circuit position (within the unified circuit design) throughout the children nodes of the respective modular circuit node. The position of the modular circuit is preferably determined from the circuit board layout, wherein the determined position parameters are assigned to the respective position attributes of the respective modular circuit node, but can be otherwise determined. However, the circuit element positions within the unified circuit can be otherwise determined.

In a second variation, applying a transformation includes removing duplicate elements from the circuit. This transformation can be applied to all branches of the virtual circuit representation in parallel, serially, or in any suitable order. This can include identifying duplicate elements and eliminating one of the duplicated elements. In one embodiment, this includes traversing through the hierarchical representation and removing all pre-identified redundant elements from the modular circuit branches. The pre-identified elements can include pads, wires, or any other suitable element having a predetermined set of attributes (e.g., component parameter). For example, the pre-identified elements can include: power in pads, wires, or leads; data out pads, wires, or leads; ground pads, wires, or leads; and/or any other suitable set of elements. In a second embodiment, the first embodiment is applied to the carrier board elements instead of the modular circuit elements. In a third embodiment, this includes applying the first variation to the circuit representation, identifying elements of the same class that share the same position (within the overall system) and/or endpoints (e.g., serve redundant roles), and removing one of the identified elements (or, for sets of more than two duplicate or otherwise redundant elements, preferably removing all but one such element). However, duplicate and/or redundant elements can be otherwise removed, and/or can be treated in any other suitable manner.

In a third variation, applying a transformation includes renaming elements within the circuit (example shown in FIG. 12). This can be desirable because unique reference designators are oftentimes required for efficient communication of design intent to circuit board assemblers and contract manufacturers. However, the elements on each modular circuit will likely begin with a "0" or "1" designation (e.g., "$R_1$" for the first resistor, "$C_1$" for the first capacitor, "$U_1$" for the first integrated circuit package, etc.), leading to redundant numbers when multiple modular circuits that have similar elements are merged together.

This transformation is preferably serially applied to each branch of the virtual circuit representation, but can be applied to any suitable branch in any suitable order. Renaming elements within the circuit preferably includes: maintaining an index of each element class or type (e.g., line, hole, resistor, capacitor, microprocessor, etc.), traversing down a branch of the circuit representation and, for each element, identifying the index associated with the element's class, assigning a number to the element based on the respective index (e.g., wherein the number can be the index value or a value calculated based on the index value), and incrementing the index, then repeating the process using the same index for the next branch. Alternatively, renaming elements within the circuit includes: determining the count of each element class within each branch, maintaining the element numbers for the elements within the first branch, and incrementing the element numbers for each successive branch by the total count for the respective element class from preceding branches. Thus, this transformation can function to rename the circuit elements such that each name (e.g., component identifier, such as an identifier to be printed on the PCB) is unique across the entire PCB assembly. For example (e.g., as shown in FIG. 12), in a unified circuit representation generated based on three modules, in which the first module includes 5 resistors and the second module includes 3 resistors, the resistor identifiers of the second module can be increased by 5 (e.g., wherein "$R_1$" of the second module becomes "$R_6$" of the unified circuit, "$R_2$" of the second module becomes "$R_7$" of the unified circuit, etc.), and the resistor identifiers of the third module can be increased by 8 (e.g., wherein "$R_1$" of the third module becomes "$R_9$" of the unified circuit, "$R_2$" of the third module becomes "$R_{10}$" of the unified circuit, etc.). However, the numbers can be otherwise reassigned.

This transformation can additionally be associated with design rules in each modular circuit that leave a fixed amount of space for each reference designator. Additionally or alternatively, the transformation can include determining the physical space for text (e.g., based on the locations and bounding boxes of the circuit objects) and dynamically scaling the text to fit the available space. However, the text parameters can be otherwise controlled.

In a fourth variation, applying a transformation includes manipulating layers from the circuit representation. Manipulation can include: removal, replacement, merging, identification of all elements associated with the layer across different branches of the representation (e.g., some or all branches), or any other suitable manipulation process. In one embodiment, manipulating layers includes removing layers. In one example, this includes removing routing layers for branches associated with a unified circuit integration attribute, such that the modular circuits are no longer machined out. In a second embodiment, manipulating layers includes replacing layers. In one example, this includes replacing routing layers for branches associated with a unified circuit integration attribute with silkscreen layers, such that routing paths are replaced with silkscreen outlines. However, any other suitable layer manipulation can be applied.

The manipulation is preferably applied after the hierarchical representation is flattened into different layers, but can be applied to the hierarchical representation or to any other suitable data structure. In one embodiment, manipulating the layers includes flattening the hierarchical representation into different layers, then manipulating the layers having parameters satisfying the manipulation parameters. In a second embodiment, manipulating the layers includes traversing through the hierarchical representation, identifying circuit objects associated with layers parameters satisfying the manipulation parameters, and changing the identified circuit object's attribute (e.g., according to a predetermined set of rules, such as removing the machining instructions). However, the layers can be otherwise manipulated.

In a fifth variation, applying a transformation includes identifying the electrical nets from each branch and merging the electrical nets across the branches into a single electrical net. In a sixth variation, applying a transformation includes identifying external electrical contacts (e.g., pads, pins, etc.) in each branch, and replacing the electrical contact with an electrical contact type associated with the integration level of the parent node. For example, all external electrical contacts (e.g., pinouts, power pins, etc.) can be replaced with pads when the parent modular circuit node is associated with a surface mount integration level, removed when the parent modular circuit node is associated with a unified circuit integration level, and replaced with pins when the parent modular circuit node is associated with a plugin (e.g., tile) integration level. However, other integration-level based transformations can be otherwise applied.

In a seventh variation, applying a transformation includes converting a single-sided circuit into a double-sided circuit. This transformation is preferably applied to the hierarchical representation, but can alternatively be applied to the flattened representation (e.g. to the layers) or otherwise applied. In one embodiment, this includes: identifying circuit objects or branches associated with the second circuit side and applying conversion transformations to the identified circuit objects. In a second embodiment, this includes: identifying circuit objects associated with a predetermined attribute value (e.g., through-hole via) and applying conversion transformations to the identified circuit objects. However, the transformations can be otherwise applied. The conversion transformations can include: reassigning the layer numbers for each of the identified circuit objects (e.g., according to a set of rules, such as reassigning the first layer as the fourth layer, if converting a 2-layer design into a four-layer design, etc.), reversing the orientation for the identified circuit objects, rotating the identified circuit objects (e.g., to create a isomer or mirror of the original design), isolating conductive leads, changing through-hole vias to blind vias (e.g., with apertures in the respective circuit side), adding a glue layer to retain the bottom elements against the circuit board (e.g., during reflow assembly), and/or any other suitable transformations.

In an eighth variation, applying a transformation includes optimizing the unified circuit design. Optimizing the design can include: replacing multiple elements with a single element (e.g., with the same, similar, or better functionality as the multiple replaced elements), replacing elements with comparable elements, minimizing cost (e.g., based on available manufacturing processes, elements, etc.), minimizing the unified circuit footprint, and/or otherwise optimizing the design. The optimization transformation that is applied can be automatically determined, manually selected, or otherwise determined. In one embodiment, optimizing the design includes reducing BOM count. In one example, reducing BOM count includes: identifying the component parameter requirements for each circuit object, identifying circuit objects that can be combined (e.g., based on spatial proximity, direct electrical connection, etc.), and replacing the identified circuit objects with a new circuit object with a component parameter value satisfying or exceeding the collective component parameter requirements of the replaced circuit objects. In a specific example, in which the BOM includes five 1Ω% precision resistors and two 1Ω5% precision resistors, the two 5% resistors can be replaced with 2% resistors that match the other five resistors.

In a ninth variation, applying a transformation includes changing a component style (e.g., through-hole components, surface-mount components, IC components) and/or fabrication type (e.g., wave soldering, reflow soldering, IC fabrication, etc.) for all or some of the components and/or modules (e.g., for the entire circuit; for a portion thereof, such as one or more contiguous regions and/or component types; etc.). In a first example, a through-hole technology module (or entire unified circuit) can be converted to surface-mount technology by modifying the bounding box of the component nodes and replacing the component-mounting via nodes with solder pad nodes (e.g., while maintaining the locations of the circuit elements within the circuit). In a second example, a PCB assembly can be converted to a monolithic integrated circuit by replacing the discrete component nodes with IC component nodes (e.g., a polysilicon resistor node; a MOSFET or MOS capacitor node that is the ancestor of multiple nodes on different layers, such as one or more metal, oxide, and silicon layers, cooperatively defining a transistor or capacitor; etc.) and removing the nodes associated with an ink layer. In a specific example of the second example, in which the circuit includes one or more discrete component nodes that represent a plurality of individual circuit elements (e.g., IC packages, such as op-amps and/or processors, which include multiple elements such as transistors, resistors, and electrical connections therebetween), the discrete component node can be replaced by a sub-tree representing the individual circuit elements. The transformation can optionally include geometrically scaling the entire module (and/or regions thereof, such as all regions that can tolerate such scaling, regions excluding sub-trees that have replaced discrete component nodes, etc.), such as reducing the module footprint (e.g., as described below regarding the ninth variation), preferably to the extent enabled by the reduction in component size.

In a tenth variation, applying a transformation includes geometrically scaling the circuit (or a portion thereof, such as one or more contiguous regions). The scaling transformation preferably maintains the original aspect ratio (e.g., such that the scaled result is geometrically similar to the original version), but can alternatively include scaling only along one direction, scaling to different extents in different directions, and/or performing any other suitable scaling. In one example of scaling in which the result is geometrically similar (or substantially geometrically similar, such as differing from exactly geometrically similar by less than a threshold amount, such as 1%, 5%, 10%, etc.), each element location coordinate (e.g., specifying a component center distance to a reference point) is reduced by a scaling factor (e.g., a factor between 0 and 1, such as 0.9, 0.75, 0.5, 0.1, 0.01, etc.), and the component electrical connection features (e.g., solder pads, through-hole component mounting vias, etc.) are preferably adjusted to overlap the component terminals (e.g., leads, flat contacts, etc.), thereby enabling proper assembly. In this example, some or all bounding boxes (e.g., bounding boxes associated with physical component dimensions, minimum metal line thicknesses, etc.) are not scaled, whereas other bounding boxes (e.g., bounding boxes associated with metal polygons) can optionally be scaled (e.g., by the same scaling factor). However, the circuit elements can be scaled in any other suitable manner.

Figure 15:
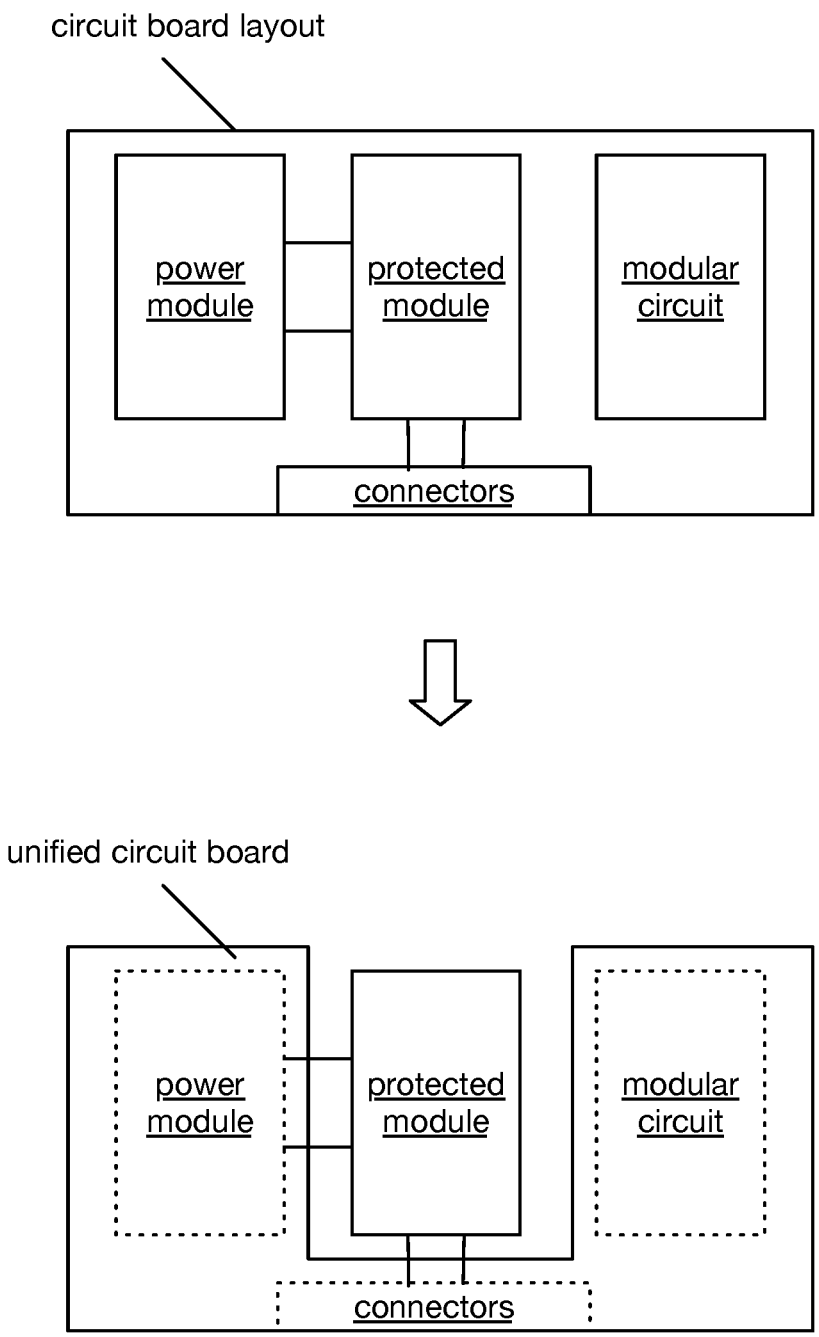
FIG. 15 is a schematic representation of a second example of the input and output of the system and/or method, including an example of a protected module.

The transformations preferably do not alter protected characteristics of protected modules (e.g., as described above regarding the system, such as regarding FCC certified devices), such as shown in FIG. 15. For example, when a protected module is merged into a unified PCB assembly, the perimeter routing node of the protected module can be retained (e.g., thereby ensuring that the certified device will exist on a physically separate PCB from the rest of the unified PCB assembly, thus complying with the certification), and structural support nodes (e.g., corresponding to jumpers electrically and mechanically connecting the protected module to the rest of the unified PCB assembly, backing plates affixed to both portions of the PCB, etc.) can be added to physically link the protected module to the unified PCB assembly. In some embodiments, the transformations can include replacing the protected module with a different module (e.g., second protected module having similar or equivalent functionality). However, the protected modules can additionally or alternatively be treated in any other suitable manner.

However, any other suitable transformation can be applied to the virtual circuit representation.

Figure 13:
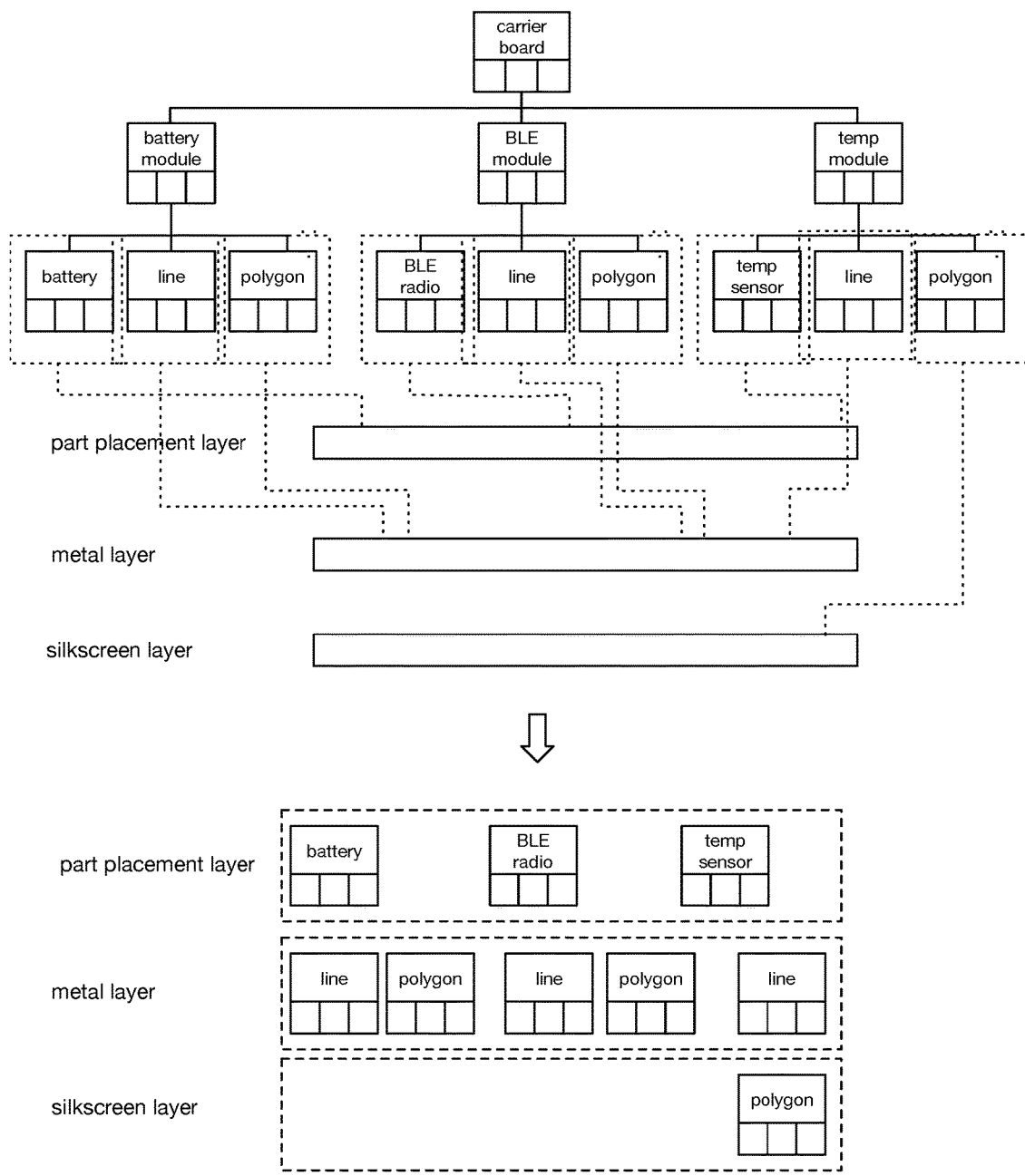
FIG. 13 is a schematic representation of generating the unified circuit board design by aggregating the circuit objects by layer.
Figure 14:
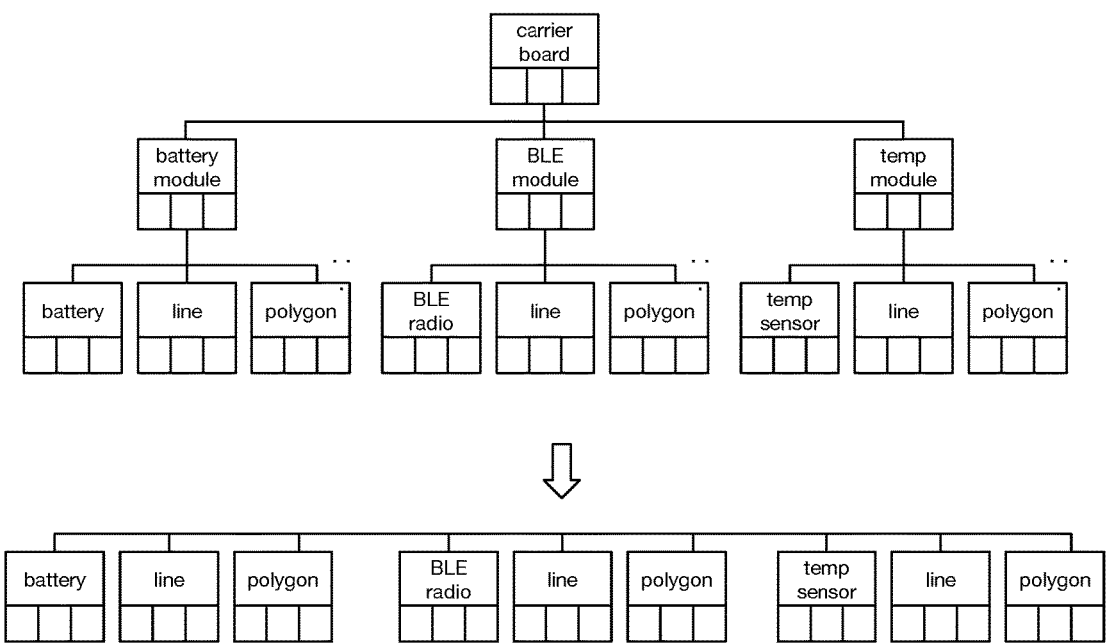
FIG. 14 is a schematic representation of generating the unified circuit board design by flattening the hierarchical representation.

Generating a unified circuit board design based on the transformed hierarchical representation functions to generate a virtual representation of the unified circuit that can be used by circuit board manufacturing processes. Generating a unified circuit board design can include: flattening the hierarchical representation of the unified circuit. Flattening the hierarchical representation can include: replacing all parent nodes with the respective children nodes until the data structure has a single layer or otherwise flattening the hierarchical representation, example shown in FIG. 14. Generating the unified circuit board design can additionally or alternatively include: identifying circuit objects associated with a predetermined set of layers and aggregating the circuit objects by layer, example shown in FIG. 13. In this variation, the method can additionally include laying out the elements, represented by the circuit objects associated with each layer, within the respective layer based on the respective elements' position, as determined from the respective circuit object position attributes (e.g., x-y position, and rotation). However, the unified circuit board design can be otherwise generated from the virtual circuit representation.

The method can optionally include translating the unified circuit board design into or from a set of ECAD (Electronic CAD) or CAM formats (e.g., proprietary formats associated with one or more ECAD programs). This is preferably performed using a set of translation modules, but can be otherwise performed. In one example, the method can include: translating a set of modular circuits from the respective source format into circuit objects using translation modules for the respective source formats, generating a hierarchical representation of the unified circuit based on a unified circuit design including the set of modular circuits, applying transformations to the hierarchical representation, generating a unified circuit board design based on the hierarchical representation, and translating the unified circuit board design into a source format using one of the translation modules. However, the translation modules can be otherwise used.

The method can optionally include generating and/or providing fabrication instructions (e.g., schematics and/or other drawings, ECAD/ECAM files such as described above, fabrication step lists, fabrication tool control code, etc.) and/or fabricating physical devices based on the circuit board designs (e.g., unified circuit board design). In a first example, the method includes: receiving a request to fabricate a tile-based device based on a circuit board design that includes a plurality of modules; for each module, based on the circuit board design, generating fabrication instructions for fabricating a sub-device (e.g., PCB assembly, such as a pin-mount or surface-mount tile) including the module; fabricating each sub-device according to the fabrication instructions; and assembling the sub-devices into the tile-based device (e.g., mounting each sub-device to a respective predefined position on a carrier board). In a second example, the method includes: receiving a request to fabricate a unified device (e.g., unitary PCB assembly) based on the circuit board design of the first example; based on the circuit board design (and/or a related design, such as a unified design in which module perimeter routing paths have been replaced by ink outlines), generating fabrication instructions for fabricating the unified device including all the modules and the circuitry of the carrier board; and fabricating the unified device according to the fabrication instructions. However, the method can additionally or alternatively include any other suitable fabrication and/or fabrication instruction generation processes implemented in any other suitable manner.

Embodiments of the system and/or method can include every combination and permutation of the various system elements and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

We claim:
1. A method for electronic circuit generation, comprising:
  receiving a first hierarchical circuit representation comprising a first plurality of electronic component nodes associated with a first component layer and a first plurality of electrical conductor nodes associated with a first metal layer;
  receiving a second hierarchical circuit representation comprising a second plurality of electronic component nodes associated with a second component layer and a second plurality of electrical conductor nodes associated with a second metal layer; and generating a unified hierarchical circuit representation comprising: a first module comprising a first module root node, a second module comprising a second module root node, a unified component layer, and a unified metal layer; wherein generating the unified hierarchical circuit representation comprises:

for each electronic component node of the first plurality of electronic component nodes: generating a respective electronic component node associated with the unified component layer, wherein the first module root node is an ancestor node of the respective electronic component node;

for each electrical conductor node of the first plurality of electrical conductor nodes: generating a respective electrical conductor node associated with the unified metal layer, wherein the first module root node is an ancestor node of the respective electrical conductor node;

for each electronic component node of the second plurality of electronic component nodes: generating a respective electronic component node associated with the unified component layer, wherein the second module root node is an ancestor node of the respective electronic component node; and for each electrical conductor node of the second plurality of electrical conductor nodes: generating a respective electrical conductor node associated with the unified metal layer, wherein the second module root node is an ancestor node of the respective electrical conductor node.

2. The method of claim 1, further comprising: providing electronic device fabrication instructions based on the unified hierarchical circuit representation.

3. The method of claim 1, wherein:
a first electronic component node of the first module is associated with a first bounding box at a first location;
a second electronic component node of the first module is associated with a second bounding box at a second location; and
a first electrical conductor node of the first module is associated with a first line region connecting the first bounding box to the second bounding box.

4. The method of claim 1, further comprising generating a monolithic integrated circuit representation based on the unified hierarchical circuit representation, wherein:
the unified hierarchical circuit representation comprises a discrete component node associated with a plurality of circuit elements; and
generating the monolithic integrated circuit representation comprises, based on the discrete component node, generating an integrated circuit component node comprising a representation of the plurality of circuit elements.

5. The method of claim 4, wherein the discrete component node is associated with a discrete op-amp component.

6. The method of claim 1, wherein:
the first hierarchical circuit representation further comprises a line node, the line node associated with a routing layer and a first module perimeter; and
generating the unified hierarchical circuit representation further comprises deleting the routing layer and associating the line node with an ink layer.

7. The method of claim 1, further comprising:
determining a first module power requirement and a second module power requirement; and
selecting a power module based on the first module power requirement and the second module power requirement;
wherein the unified hierarchical circuit representation further comprises the power module.

8. The method of claim 1, wherein:
each electronic component node of the first and second pluralities of electronic component nodes is associated with a respective component parameter; and
for each electronic component node of the first and second pluralities of electronic component nodes, the respective electronic component node associated with the unified component layer is associated with the respective component parameter.

9. The method of claim 8, wherein:
a first electronic component node of the first module is associated with an electrical property value and a first tolerance requirement; and
a second electronic component node of the first module is associated with the electrical property value and a second tolerance requirement more restrictive than the first tolerance requirement;
the method further comprising generating a bill of materials based on the unified hierarchical circuit representation, comprising:
determining an identifier of a physical component having an electrical property substantially equal to the electrical property value and a tolerance satisfying the second tolerance requirement; and
adding the identifier to the bill of materials in association with the first electronic component node and the second electronic component node.

10. The method of claim 9, wherein the electrical property value is selected from the group consisting of: a resistance value, a capacitance value, and an inductance value.

11. The method of claim 1, further comprising: fabricating an electronic device based on the unified hierarchical circuit representation.

12. The method of claim 1, further comprising:
determining fabrication instructions, based on the unified hierarchical circuit representation, for a unified electronic device; and
providing the fabrication instructions to a circuit fabricator.

13. The method of claim 1, wherein a unified electronic device associated with the unified hierarchical circuit representation is fabricated.

14. A method for electronic circuit generation, comprising:
receiving a first circuit representation comprising a first plurality of electronic component objects and a first plurality of electrical conductor objects;
receiving a second circuit representation comprising a second plurality of electronic component objects and a second plurality of electrical conductor objects; and
generating a unified hierarchical circuit representation comprising: a first module and a second module; wherein generating the unified hierarchical circuit representation comprises:
for each electronic component object of the first plurality of electronic component objects: generating a respective electronic component object of the unified hierarchical circuit representation, the respective electronic component object associated with the first module;
for each electrical conductor object of the first plurality of electrical conductor objects: generating a respective electrical conductor object of the unified hierarchical circuit representation, the respective electrical conductor object associated with the first module;

for each electronic component object of the second plurality of electronic component objects: generating a respective electronic component object of the unified hierarchical circuit representation, the respective electronic component object associated with the second module; and for each electrical conductor object of the second plurality of electrical conductor objects: generating a respective electrical conductor object of the unified hierarchical circuit representation, the respective electrical conductor object associated with the second module.

15. The method of claim 14, further comprising:
receiving a first virtual electronic circuit represented in a first proprietary electrical CAD format;
receiving a second virtual electronic circuit represented in a second proprietary electrical CAD format different from the first proprietary electrical CAD format;
generating the first circuit representation based on the first virtual electronic circuit; and
generating the second circuit representation based on the second virtual electronic circuit.

16. The method of claim 14, further comprising:
determining a first value, associated with the first module, of a module parameter;
determining a second value, associated with the second module, of the module parameter; and
selecting an auxiliary module based on the first value and the second value;
wherein the unified hierarchical circuit representation further comprises the processing module.

17. The method of claim 16, wherein:
the module parameter is associated with a module computing requirement; and
the auxiliary module is a computing module.

18. The method of claim 14, wherein: the first circuit representation defines a first spatial arrangement; the second circuit representation defines a second spatial arrangement; the first module defines a first module spatial arrangement substantially geometrically similar to the first spatial arrangement; and the second module defines a second module spatial arrangement substantially geometrically similar to the second spatial arrangement.

19. The method of claim 14, further comprising fabricating a tile assembly based on the unified hierarchical circuit representation, comprising:
fabricating a first PCB assembly associated with the first module, the first PCB assembly comprising a first PCB, a first plurality of electronic components associated with the first plurality of electronic component objects, and a first mounting mechanism;
fabricating a second PCB assembly associated with the second module, the second PCB assembly comprising a second PCB, a second plurality of electronic components associated with the second plurality of electronic component objects, and a second mounting mechanism; and
attaching the first and second mounting mechanisms to a carrier, wherein a first electronic component of the first plurality of electronic components is electrically coupled to a second electronic component of the second plurality of electronic components via the carrier.

20. The method of claim 14, further comprising:
selecting a set of physical components, comprising, for each electronic component object of the unified hierarchical circuit representation, selecting a respective physical component; and
fabricating a unified electronic device based on the unified hierarchical circuit representation, wherein the unified electronic device comprises the set of physical components.

21. The method of claim 20, wherein the set of physical components comprises a plurality of discrete components.

22. The method of claim 21, further comprising generating instructions for fabrication of a monolithic integrated circuit based on the unified hierarchical circuit representation.

23. The method of claim 22, wherein:
each discrete component of the plurality is associated with a respective component property value; and
the instructions for fabrication of the monolithic integrated circuit comprise, for each discrete component of the plurality, instructions for fabrication of a corresponding IC element associated with the respective component property value.

* * * * *

UNITED STATES PATENT AND TRADEMARK OFFICE
CERTIFICATE OF CORRECTION

PATENT NO. : 10,372,863 B2
APPLICATION NO. : 16/106584
DATED : August 6, 2019
INVENTOR(S) : Timothy Matthew Burke et al.

Page 1 of 1

It is certified that error appears in the above-identified patent and that said Letters Patent is hereby corrected as shown below:

In the Claims

Column 19, Line 39, after "wherein:", insert --¶--
Column 19, Line 40, after "arrangement;", insert --¶--
Column 19, Line 41, after "arrangement;", insert --¶--
Column 19, Line 44, after "and", insert --¶--

Signed and Sealed this
Third Day of March, 2020

Andrei Iancu
*Director of the United States Patent and Trademark Office*